(12) United States Patent
Strauser

(10) Patent No.: US 9,423,844 B2
(45) Date of Patent: Aug. 23, 2016

(54) CRADLES HAVING HINGED BACK WALLS

(71) Applicant: DOK SOLUTION LLC, Largo, FL (US)

(72) Inventor: Jack Strauser, Largo, FL (US)

(73) Assignee: DOK SOLUTION LLC, Largo, FL (US)

( * ) Notice: Subject to any disclaimer, the term of this patent is extended or adjusted under 35 U.S.C. 154(b) by 185 days.

(21) Appl. No.: 14/463,683

(22) Filed: Aug. 20, 2014

(65) Prior Publication Data

US 2014/0361751 A1    Dec. 11, 2014

Related U.S. Application Data

(63) Continuation-in-part of application No. 14/134,227, filed on Dec. 19, 2013, which is a continuation-in-part of application No. 13/345,994, filed on Jan. 9, 2012, now Pat. No. 8,675,356, which is a continuation-in-part of application No. 13/373,076, filed on Nov. 3, 2011, now Pat. No. 8,593,802, which is a continuation-in-part of application No. 12/699,078, filed on Feb. 3, 2010, now Pat. No. 8,116,077, which is a continuation-in-part of application No. 11/676,850, filed on Feb. 20, 2007, now Pat. No. 7,742,293.

(51) Int. Cl.
| | |
|---|---|
| *H05K 5/00* | (2006.01) |
| *H05K 7/00* | (2006.01) |
| *G06F 1/16* | (2006.01) |
| *G06F 1/26* | (2006.01) |
| *G06F 1/18* | (2006.01) |
| *H02J 7/00* | (2006.01) |

(52) U.S. Cl.
CPC ............. *G06F 1/266* (2013.01); *G06F 1/1632* (2013.01); *G06F 1/18* (2013.01); *H02J 7/0027* (2013.01); *H02J 7/0044* (2013.01)

(58) Field of Classification Search
CPC ..................................................... G06F 1/1632
USPC .............................. 361/679.4, 679.41, 679.44
See application file for complete search history.

(56) References Cited

U.S. PATENT DOCUMENTS

| | | | |
|---|---|---|---|
| 6,524,240 B1 | 2/2003 | Thede | |
| D513,938 S | 1/2006 | Griffin | |
| 7,399,198 B2 * | 7/2008 | Thalheimer | H04R 5/02 439/501 |
| D579,443 S | 10/2008 | Donovan et al. | |
| D589,930 S | 4/2009 | McGeeney | |
| D595,722 S | 7/2009 | Miyawaki | |
| D600,251 S | 9/2009 | Poandl | |
| 7,719,830 B2 * | 5/2010 | Howarth | G06F 1/1632 312/223.2 |
| 7,840,740 B2 * | 11/2010 | Minoo | G06F 1/1632 710/300 |
| 7,853,745 B2 | 12/2010 | Muraki | |

(Continued)

*Primary Examiner* — Anthony Haughton
(74) *Attorney, Agent, or Firm* — Larson & Larson, P.A.; Frank Liebenow; Patrick Reid

(57) ABSTRACT

A consumer electronic system for holding and providing power to any number of consumer electronic devices has cradles and each of the cradles has a pair of folding support walls. The pair of folding support walls are separated by a gap, allowing for a device cable to be routed between the two sections so that, when a consumer electronic device is within the cradle and connected to a power port for charging or use (by the cable) the consumer electronic device sits properly. Since the device cable, passes through this gap, the device cable doesn't perturb the consumer electronic device (e.g., allowing for a stable containment of the consumer electronic device at a proper viewing angle).

20 Claims, 5 Drawing Sheets

(56) References Cited

U.S. PATENT DOCUMENTS

| | | | |
|---|---|---|---|
| 8,054,042 B2 | 11/2011 | Griffin et al. | |
| 8,115,451 B2 | 2/2012 | Griffin et al. | |
| 8,195,114 B2 * | 6/2012 | Krampf | H03J 1/0025 455/154.1 |
| 8,311,256 B1 | 11/2012 | Strauser | |
| 8,320,597 B2 | 11/2012 | Griffin et al. | |
| 8,366,480 B2 * | 2/2013 | Neu | H04R 5/00 439/374 |
| 8,477,953 B2 * | 7/2013 | Hobson | H01R 13/748 381/59 |
| 2004/0150944 A1 | 8/2004 | Byrne et al. | |
| 2006/0013411 A1 * | 1/2006 | Lin | H04R 5/02 381/87 |
| 2006/0116009 A1 | 6/2006 | Langberg et al. | |
| 2006/0127034 A1 | 6/2006 | Brooking et al. | |
| 2006/0181840 A1 * | 8/2006 | Cvetko | B60R 11/02 361/679.55 |
| 2006/0221776 A1 * | 10/2006 | Roman | G10H 1/0091 369/1 |
| 2006/0250764 A1 * | 11/2006 | Howarth | G06F 1/1632 361/679.41 |
| 2007/0058332 A1 | 3/2007 | Canterbury et al. | |
| 2007/0291475 A1 | 12/2007 | Heathcock | |
| 2008/0307144 A1 * | 12/2008 | Minoo | G06F 1/1632 710/304 |
| 2009/0009957 A1 | 1/2009 | Crooijmans et al. | |
| 2009/0129010 A1 | 5/2009 | Park et al. | |
| 2009/0295328 A1 | 12/2009 | Griffin, Jr. | |
| 2010/0195279 A1 | 8/2010 | Michael | |
| 2011/0216495 A1 | 9/2011 | Marx | |
| 2012/0106069 A1 | 5/2012 | Strauser | |

* cited by examiner

CRADLES HAVING HINGED BACK WALLS

CROSS-REFERENCE TO RELATED APPLICATION

This application is a continuation-in-part of U.S. patent application Ser. No. 14/134,227, filed Dec. 19, 2013; which in turn is a continuation-in-part of U.S. Pat. No. 8,675,356 issued on Mar. 18, 2013; which in turn is a continuation-in-part of U.S. Pat. No. 8,593,802 issued on Nov. 6, 2013; which in turn is a continuation-in-part of U.S. Pat. No. 8,116,077 issued on Feb. 14, 2012, which in turn is a Continuation-in-Part of U.S. Pat. No. 7,742,293 issued on Jun. 22, 2010, the disclosures of the above are hereby incorporated by reference. This application is related to U.S. Pat. No. 8,593,804 issued on Nov. 26, 2013, which is also incorporated by reference.

FIELD

This invention relates to the field of consumer electronic devices and more particularly to a system for supporting multiple consumer electronic devices while the consumer electronic devices are, for example, in use and/or charging.

BACKGROUND

Many consumer electronic devices are powered by an internal rechargeable battery and, to recharge the battery, the consumer electronic devices are connected to an external source of electrical power while an internal circuit controls charging of the internal rechargeable battery.

One recharging system includes what is often referred to as a "wall wart." A "wall wart" is typically a sealed transformer and/or power conditioning circuit connected to an typical A/C plug (approximately 117 VAC in the USA). Conditioned power from the wall wart is transferred to the consumer electronic device through a cable and a cable connector. The connector mates with a corresponding connector on the consumer electronic device. For example, many new smart phones have miniature USB connectors. These miniature USB connectors mate with male miniature USB connectors at an end of a power cable, in turn connected to a wall wart that provides conditioned 5 VDC power. This method of charging functions but causes clutter; particularly when users have multiple devices. Additionally, each wall wart that remains plugged into A/C power drains a small amount of A/C power even when not charging the consumer electronic devices. Users often disconnect their device after charging but fail to unplug their wall wart from the A/C power outlet. This results in a waste of energy.

Lately, there has been a movement to standardize charging from a voltage of 5 VDC as provided with the Universal Serial Bus standard. This standard would apply whether power was provided through a miniature USB connector or through a proprietary connector, as is at times found on some cellular phones. Suppliers of consumer electronic devices often provide a cable having a standard USB connector at one end for connecting to a 5 VDC source, and a mating connector for connecting to the consumer electronic device at the other end. The user is able to obtain 5 VDC power for the standard USB connector at many sources, such as: wall warts that have a female standard USB connector, computer systems with USB ports, airport charging stations, female USB connectors in vehicles, etc. Still, many find use the wall wart that is usually included with their device, leaving the wall wart plugged into A/C power for longer than needed.

There are cradles for holding consumer electronic devices and, optionally, use while charging. Some of the cradles use the wall wart provided with the consumer electronic devices. Others have their own power source. There are times when a user wishes to use the device while charging. For example, one may wish to watch a movie on some consumer electronic devices while the consumer electronic device is in a cradle.

Some such cradles include integrated connectors for directly connecting to the consumer electronic devices, making such cradles dedicated to one or a small family of consumer electronic devices. Other cradles provide a cable for connection to the consumer electronic devices, routing of the cable is not convenient.

There are chargers that have multiple USB female connectors for concurrently charging multiple consumer electronic devices through cables. In such, the devices are not typically held or supported in any particular position on such charges and the devices being charged must rest on surfaces such as countertops.

Recently, several manufacturers have created home entertainment systems that have one or more charging stations that connect to the consumer electronic devices; some having cradles to support the consumer electronic devices. Home entertainment systems already use some "parasitic" power to maintain clocks (time of day) and maintain a standby state waiting for a command from a remote control. Therefore, since such devices already use a small amount of "parasitic" power, there is little or no additional power used to make those devices ready to power/charge the consumer electronic devices.

Such entertainment systems sometimes include a docking port for one particular consumer electronic device such as a docking port for one particular manufacturer's digital music player. In some entertainment systems, a consumer electronic device rests in and plugs into a fixed connector. In such, if the manufacturer of such devices releases newer products with a different connector type or connector position, the entertainment system is no longer useful for the new devices and a different entertainment system is needed for the new devices. This recently occurred with a major phone manufacturer which changed the connector type on all new phones and, those who had entertainment systems that supported and charged the old style phone found these entertainment systems to be obsolete after upgrading to the new phone.

In modern times, many individuals and families own multiple devices that need charging several times per week. For example, on any given day, a single person owning a smart phone, digital music player, and a tablet PC will find a need to charge one or more of these consumer electronic devices. There are charging stations that accept multiple devices, having cradles for smaller devices such as smart phones, yet requiring larger consumer electronic devices (e.g. tablet PCs) to rest on a horizontal surface. There are many drawbacks to resting consumer electronic devices horizontally including, but not limited to, increasing the risk of damage from setting heavy objects on the larger consumer electronic device's display, splatter from nearby sources of liquids (e.g., sinks), increased dust adhesion, fluid penetration from a nearby spill, etc.

Some recent consumer products include charging ports and locations for holding one or more consumer electronic devices. There are many amplified speaker systems or clock radio systems that include a cradle with or without an integrated connector for one particular consumer electronic device. These consumer electronic devices generally support exactly one consumer electronic device.

There are several problems with prior consumer electronic systems that support one or more consumer electronic devices. Many or all such consumer electronic systems support consumer electronic i-devices (e.g. those made by a particular manufacturer that names their products starting with an "i") from only a single manufacturer. Many or all such consumer electronic systems support only a small, very limited size range of consumer electronic devices, typically only one or a small subset of all possible consumer electronic devices such as only one i-device. Many or all such consumer electronic systems do not support larger consumer electronic devices such as tablet computers. Many or all such consumer electronic systems do not concurrently support smaller consumer electronic devices concurrently while supporting larger consumer electronic devices such as tablet computers. Many or all such consumer electronic systems do not provide proper physical support for larger consumer electronic devices such as tablet computers. Many or all such devices do not allow viewing of each device's display while docked and charging.

What is needed is a system that will support and charge a mix of consumer electronic devices in a proper orientation while properly supporting these devices.

SUMMARY

A consumer electronic system for holding and providing power to any number of consumer electronic devices has cradles and each cradle has folding support walls. The folding support walls are in two sections are separated by a gap, allowing for a device cable to be routed between the two sections so that, when a consumer electronic device is within the cradle and connected to a power port for charging or use, the consumer electronic device rests or sits properly. Since the device cable, passes through this gap, the device cable doesn't perturb the consumer electronic devices (e.g., allowing for a stable containment of the consumer electronic devices at a proper viewing angle).

In one embodiment, a consumer electronic system is disclosed including an enclosure and a cradle formed in the enclosure. The cradle has a cavity and two folding support walls. The cavity is sized to contain at least one portion of a consumer electronic device and each of the support walls has a deployed position for supporting the consumer electronic device and has a collapsed position. A power port is interfaced to the enclosure for accepting a host end connector of a device cable, a second end of the device cable has a device end connector for connecting to the consumer electronic device. The cable removably passes through a gap between the two folding support walls for positioning the device end connector and at least a portion of the consumer electronic device within the cavity.

In another embodiment, a method of charging a consumer electronic device is disclosed including providing a consumer electronic system having an enclosure with a cradle formed in the enclosure. The cradle has a cavity and two folding support walls. The cavity is sized to contain at least one portion of a consumer electronic device and each of the support walls has a deployed position for supporting the consumer electronic device and a collapsed position. A power port interfaced to the enclosure. The method includes connecting a host end connector of a cable to the power port and connecting a device end connector of the cable to a consumer electronic device, then routing the cable through the gap between the two folding support walls such that the device end connector is situated within the cavity and the consumer electronic device is supported by the cradle and two folding support walls.

In another embodiment, a consumer electronic system is disclosed including an enclosure that has several cradles formed in the enclosure. The cradles are for supporting any of a plurality of consumer electronic devices. Each of the cradles has a cavity and two folding support walls. The cavity is sized to contain at least one of the consumer electronic devices and each of the support walls has a deployed position in which a consumer electronic device is provided support and a collapsed position. There are also power ports interfaced to the enclosure, each power port capable of accepting a host end connector of a device cable. A second end of each of the device cables has a device end connector for connecting to the consumer electronic devices. The cables removably pass through gaps between the two folding support walls for positioning each of the consumer electronic devices and the device end connector at least partially within the cavity.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
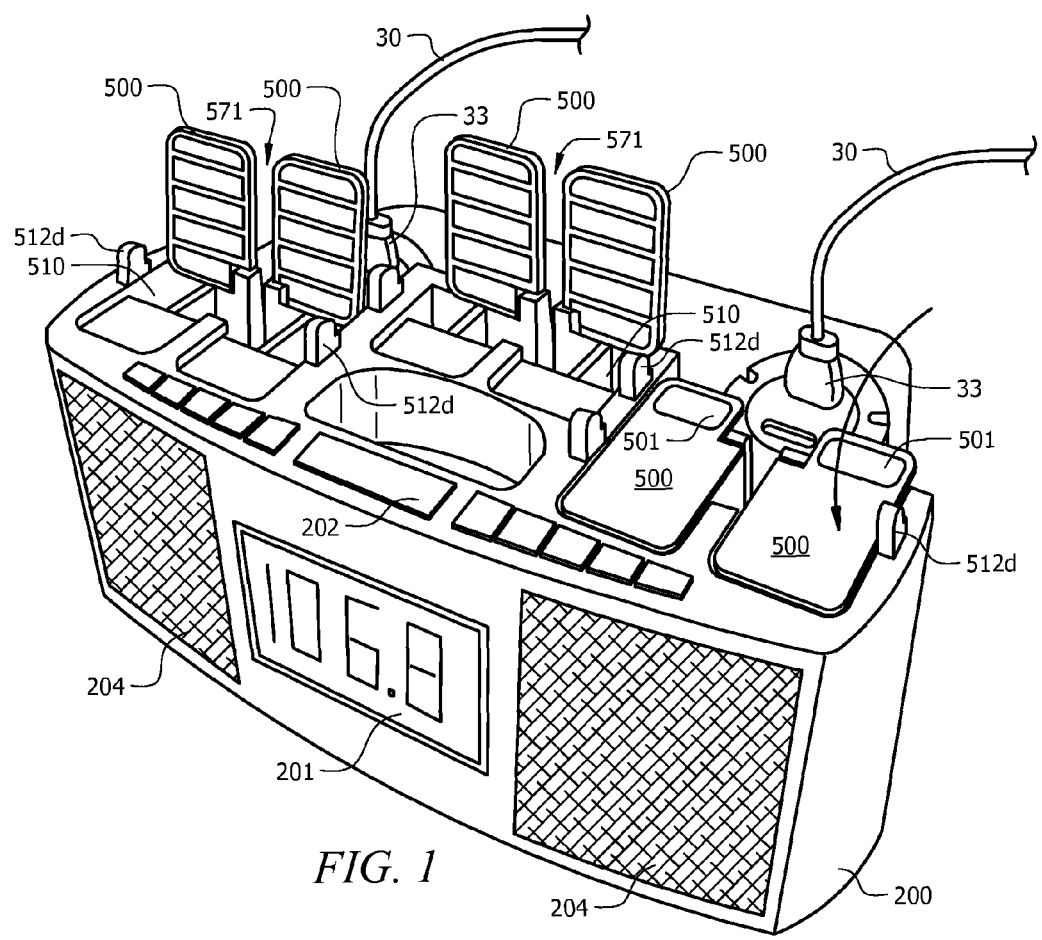
FIG. 1 illustrates a front perspective view of a consumer electronic system having multiple consumer electronic device cradles, showing the operation of the hinged support walls of the cradles.

Reference will now be made in detail to the presently preferred embodiments of the invention, examples of which are illustrated in the accompanying drawings. Throughout the following detailed description, the same reference numerals refer to the same elements in all figures.

Throughout this description, the term, "consumer electronic device" refers to any handheld electronic devices such as digital music players (i-devices, MP3 players, etc.), digital media players (e.g., MP4 players, movie players), cellular phones (e.g., smart phones, i-phones), portable Global Positioning Satellite (GPS) devices, tablet computing devices (e.g. i-tablet computers), exercise tracking devices, etc. Any portable consumer electronic device is anticipated, whether or not the consumer electronic device has an internal rechargeable power source. Some consumer electronic devices have persistent storage for storing audio content (music) or video content (movies) such as a micro-hard disk or flash memory. Under user control, these files are retrieved, uncompressed and converted to audio and/or video. The analog audio signal is often emitted in a 3.5 mm or 2.5 mm stereo headphone jack for the user to connect headphones or other reproduction devices. Some devices have a specialized data/power connector for connecting to a source of power and/or transferring data (e.g. music) to/from the consumer electronic device. Many consumer electronic devices have graphical displays.

Throughout this description, the term, "consumer electronic system" refers to systems that supports/holds and optionally charges consumer electronic device. Consumer electronic systems optionally perform other functions such as amplifying audio and presenting the audio through speakers, as well as displaying the time, clock radio functions, etc.

Throughout this description, the term, "USB port" refers to an industry standard interface port, commonly known as "Universal Serial Bus." This particular port has become ubiquitous for many applications and uses, many of which do not utilize the integrated high-speed serial interface, and, instead, use only the standard power connection for powering of devices connected to the USB ports (e.g., digital music players, smart phones . . . ). Although the specific term, "USB" is used throughout this description and drawings, the invention and claims are not limited to any particular port or type of port, connector, nor is it limited to using such port for power only, power and communications, or communications only.

Figure 2:
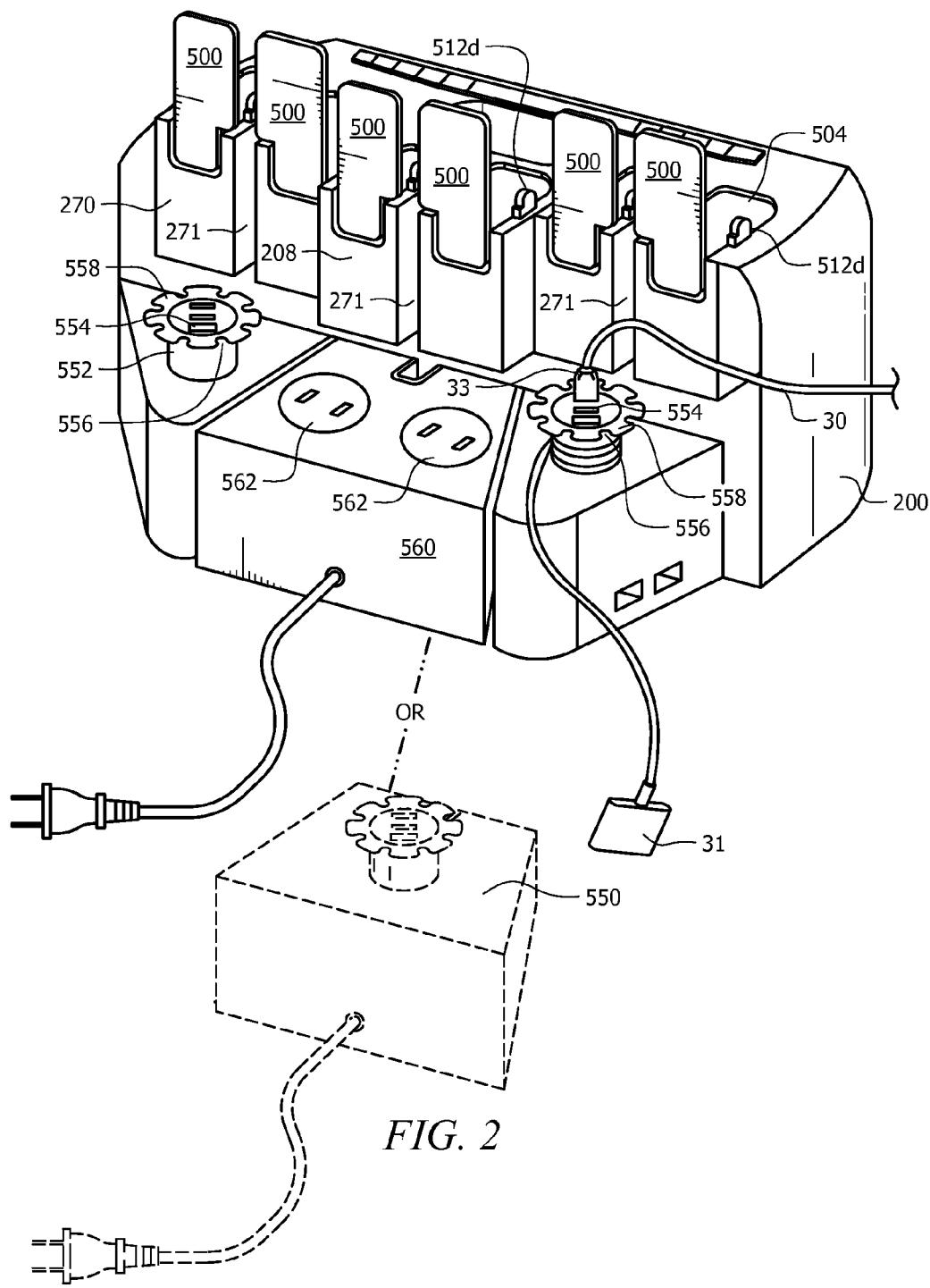
FIG. 2 illustrates a rear perspective view of the consumer electronic system having multiple consumer electronic device cradles.
Figure 3:
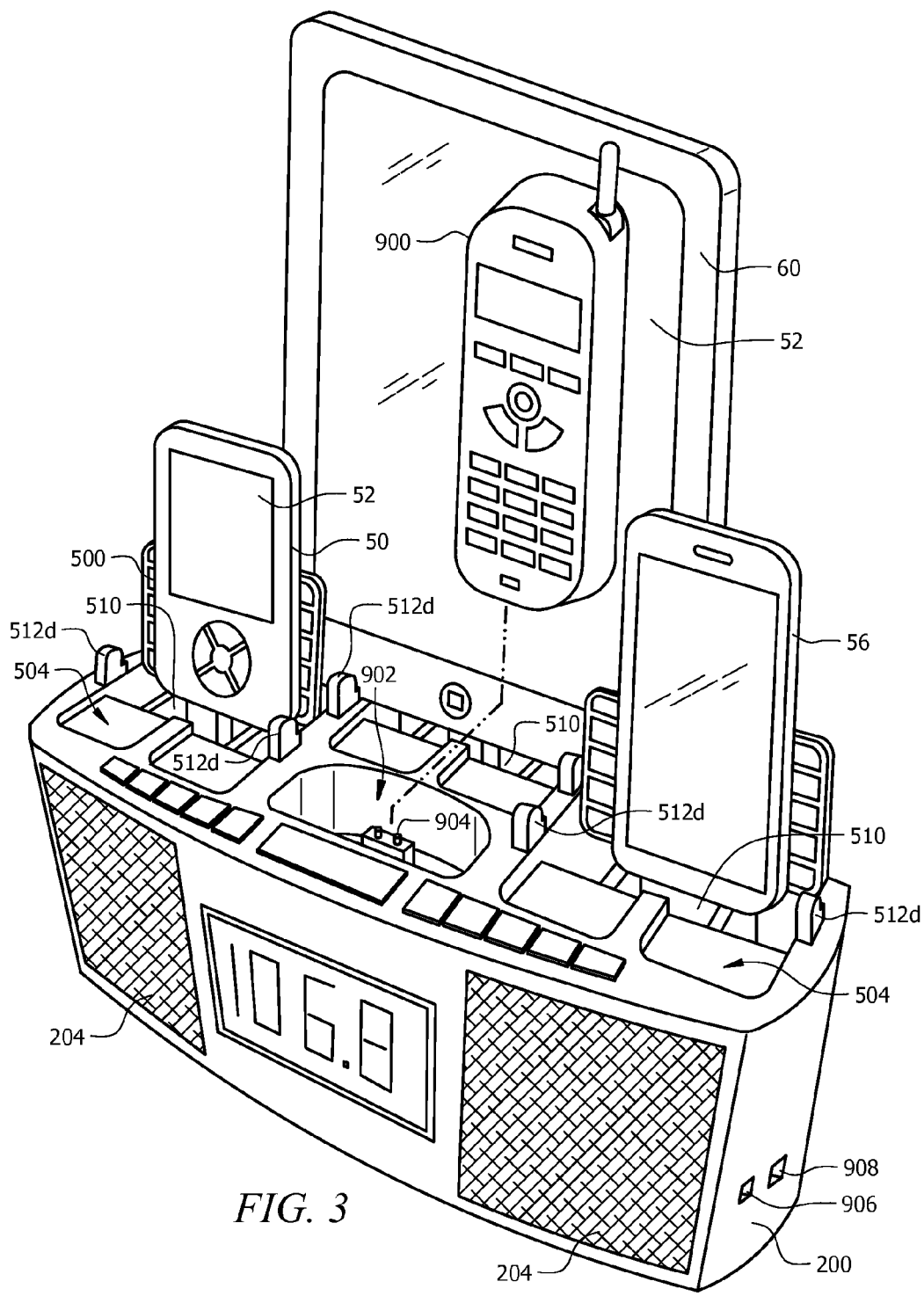
FIG. 3 illustrates a front perspective view of the consumer electronic system having multiple consumer electronic device cradles with consumer electronic devices held in the cradles.

Referring to FIGS. 1, 2, and 3, perspective views of a consumer electronic system 200 having multiple consumer electronic device cradles 208/270 is shown. In this example, the consumer electronic system 200 is shown having three cradles 208/270, although any number of cradles 208/270 is anticipated, including, but not limited to one cradle 270. Each cradle 208/270 has a set (pair) of support walls 500 for resting a consumer device 50/56/60 (see FIG. 2) against such. For smaller consumer devices 50, an end of the consumer device rests within the cavity 510. Each support wall 500 has a gap 271 for cable routing. Although not required, it is preferred that the gap 271 continue to the bottom of the cavity 510 such that, when consumer devices that have bottom edge connectors rest in the cavity 510, the cable 30 is easily routed out through the gap 271 without perturbing the consumer device 50/56/60.

Figure 4:
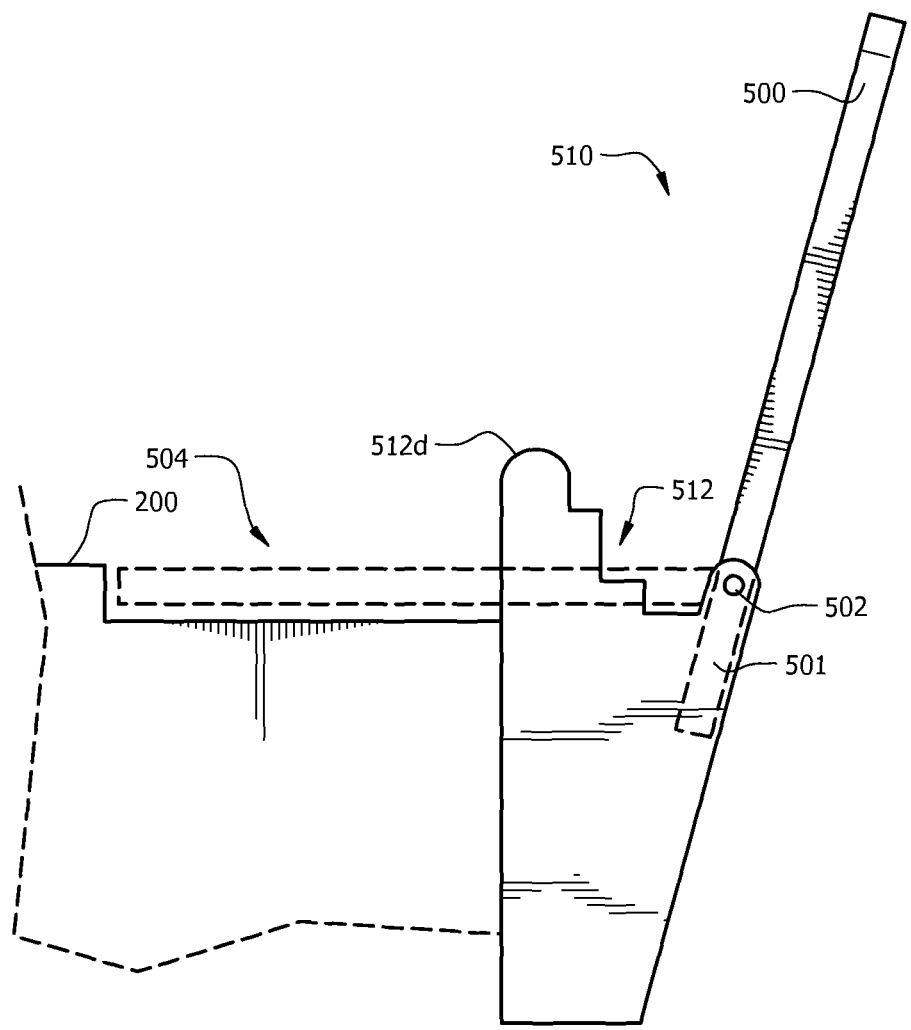
FIG. 4 illustrates a side view of the support walls operation of the cradles.

As shown in FIGS. 2-4, in some embodiments cutouts 504 are provided such that when the support walls 500 are in the closed position, the support walls 500 preferably lay flush within the cutouts 504 in the enclosure of the consumer electronic system 200. To facilitate ease in deploying the support walls 500, in a preferred embodiment, a tail end 501 of each support wall 500 is positioned on an opposing side of the pivot point 502 (see FIG. 4) to provide ease of deploying, in that, when the support walls 500 are in the closed position, pressing on the tail end 501 of the support walls 500, flip the support walls 500 into the deployed position, ready to support a consumer device 50/56/60.

In some embodiments, the cradles 208/270 are staggered with one cradle 208 positioned behind other cradles 270. In this way, a larger consumer electronic device 60 (e.g. a tablet computer 60) is accommodated within the cradle 208 (e.g. between the support wall 500 and the nubs 512d) without encroaching on the other cradles 270 as shown in FIG. 3.

In some embodiments, a cable manager is provided, preferably through a wire spool 552 with cap 558. In the example shown, the wire spool 552 has a cap 558 with one or more cable clips 556 (U-shaped indentations that hold a cable 30 that is pressed into the clips 556) around a periphery of the cap 558. In use a host-end (end towards the host connect 33) of the device cable 30 is wrapped around the wire spool 552 then fed through one of the cable clips 556 to maintain such wrapping. The USB connector 33 of the cable 30 is plugged into a USB port 554 that, in this example, is positioned on the cap 558. Note, in alternate embodiments, other locations for the USB ports 554 are anticipated, including locations on the consumer electronic system 200. Although each cap 558 is shown with three USB ports 554, any number of USB ports 554 is anticipated, including one USB port 554, as well is any type of connector, not limited to a USB port 554 or USB connector 554.

In some embodiments, nubs 512d are located on the base at the top-front of each cavity 510. The nubs 512d provide support to larger consumer electronic devices 60 that don't fit within the cavity 510.

Although not required, it is preferred that each cradle be staggered as shown. Such staggering provides visibility of each consumer electronic device's display 52 while, for example, charging. Note, that it is also anticipated that, other than charging, the consumer electronic systems 200 also includes data connections on the USB ports 554 and, in some embodiments, provide USB hub functionality (not shown) in support of data connection while the consumer electronic devices 50/56/60 are charging. In such, the interface connectors 554 include data connections as well as power connections.

Referring to FIG. 2, exchangeable center devices 550/560 are shown. In anticipation of different applications, some models of the consumer electronic system 200 require additional USB ports 554 and spools 556 as shown on the installed exchangeable center device 550, while in other models of the consumer electronic system 200, household power outlets 562 are needed as shown on the second exchangeable center device 560. These are examples of two anticipated options for center devices 550/560 and there is no limitation on the type, size, or location of such options. For example, some exchangeable center devices 550/560 provide wireless hub capability, lighting, extended base for music, etc.

In this example, the exchangeable center devices 550/560 have household power cables and plugs (as shown for US power outlets). In some embodiments, the circuit that converts household power to 5V DC is housed within the exchangeable center devices 550/560 and a DC connector bridges the 5V DC power to the consumer electronic system 200 while in some embodiments, household power is passed through connectors between the exchangeable center devices 550/560 and the consumer electronic system 200 and the circuit that converts household power to 5V DC is housed within the consumer electronic system 200. Note that 5V DC is used as a typical example and any voltage is anticipated as needed. Likewise, although a United States standard household power plug is shown, any power connection is anticipated to any power source in the world.

For completeness, the exemplary consumer electronic system 200 is a clock radio having a time display 201, speakers 204, and controls 202, though this is only an example and any type of consumer electronic system 200 is anticipated.

Referring to FIGS. 2 and 4, the support wall operation is shown. In FIG. 2, it is shown how the support walls 500 fold, swinging open for holding devices and swinging closed for aesthetics and reduced size during shipping. In FIG. 2, the support walls 500 are shown open (up) for the left two cradles 270 and are shown closed for the right cradle 270. As shown in FIG. 3, each of the consumer electronic devices 50/56/60 rest against the support walls 500, either resting one end of the consumer electronic devices 50/56/60 within the cavities 510 or wedging an end of, for example, the larger devices 60 between the folding support walls 500 and the nubs 512d.

For various reasons, including appearance, smaller shipping size, dust reduction, the support walls 500 close as shown by way of the right-most set of support walls 500 on the right-most cavity 270 of FIG. 1. Being that it is important to pass the device cables 30 through the slits 271 in the back of the cradles 208/270, the support walls 500 are made in two sections with a gap 571 between the sections allowing for passing of the device cables 30. In this way, the device cables 30, being connected to the consumer device 50/56/60 (e.g. during use or charging), are easily fed through this gap 571 between the support walls 500 and through the gap 271 in the cradle 208/270 when the consumer device 50/56/60 is placed in/on the cradle 208/270. By way of this configuration, a consumer device 50/56/60 will rest steadily on the cradles 208/270 and the device cable 30 will be properly dressed such that the device cable 30 does not perturb the consumer device 50/56/60, making the consumer device 50/56/60 unstable and/or resting at an angle which impairs display readability. The user doesn't have to feed a large connector and cable through a small hole as with some consumer systems nor insert the consumer device 50/56/60 into the cradle 208/270 with the cable 30 sticking out of the cradle 30, making the consumer device 50/56/60 unstable or crooked. Also, often people need to remove their cable 30, requiring the reverse action when, for example, leaving home for the office.

In some embodiments of the consumer electronic system 200, electronics and features support a phone 900, including a phone support cradle 902 for holding and supporting the phone 900 and, when the phone is a cordless phone, a cordless phone connector 904 for providing charging and/or voice connections to the cordless phone 900 when the cordless phone 900 is within the cordless phone support cradle. In embodiments when the phone 900 is not cordless, it is anticipated that a phone cable (not shown) connect the phone 900 to the consumer electronic system 200 and, preferably, the cord spools onto an internal spool within the consumer electronic system 200. In embodiments having a phone 900, a phone jack 906 is supplied for connection to the phone system (not shown) and internal electronics are supplied, as known in the cordless phone industry, for charging of and for wireless connection to the cordless phone 900.

In some embodiments, the consumer electronic system 200 further includes a wireless hub for wireless connections to various devices, for example, an 802.11 (Wi-Fi) wireless hub. In such embodiments, one or more antenna are present, either internal or external (not shown for brevity reasons) and a network jack 908 is included for connection to a network interface such as a cable modem, etc.

In FIG. 4, it is shown how the folding support walls 500 transition from an extended position (deployed) to a retracted position. When deployed, the support walls 500 support a consumer device 50/56/60 that rests within the cavity 510. When retracted (shown in dashed lines), the support walls 500 preferably lay flush as shown laying within a cutout 504 in the enclosure of the consumer electronic system 200.

In the example shown, the foldable support walls 500 are hingedly held to the consumer electronic device's 200 enclosure by pivots 502, for example, hinge pins, pivot pins, screws, nubs, etc. Any form of foldable construction is anticipated. To facilitate ease in deploying the support walls 500, in a preferred embodiment, a tail end 501 of each support wall 500 is positioned on an opposing side of the pivot point 502 (see FIG. 4) to provide ease of deploying, in that, when the support walls 500 are in the closed position, pressing on the tail end 501 of the support walls 500, flip the support walls 500 into the deployed position, ready to support a consumer device 50/56/60.

In a preferred embodiment, the cavities 510 are stepped (or staggered) with one or more steps 512 as described in the patents that are included by reference. These steps allow for successively smaller consumer devices 50/56/60 to fit within successively smaller openings formed by successive steps 512.

Figure 5:
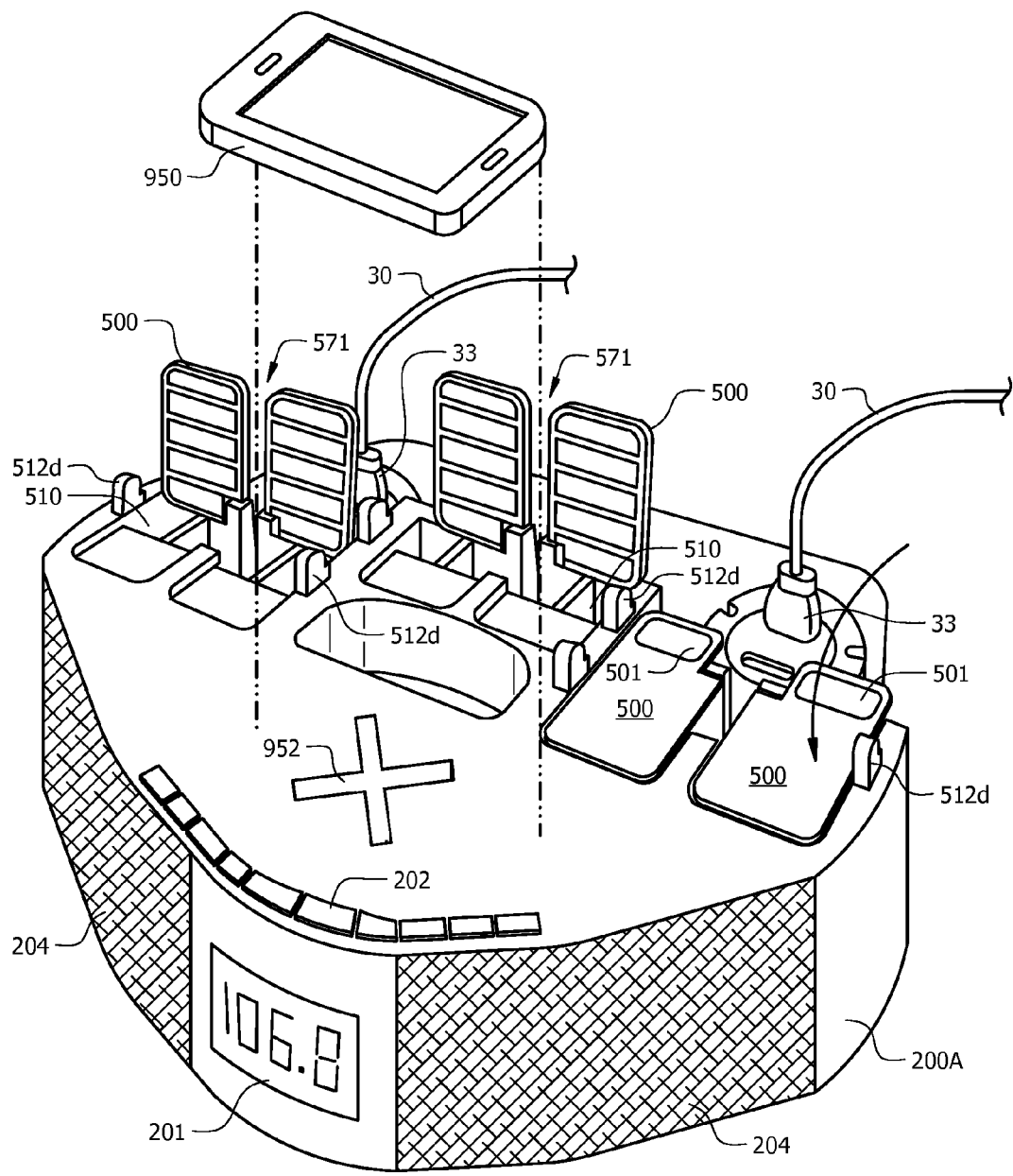
FIG. 5 illustrates a front perspective view of a consumer electronic system having multiple consumer electronic device cradles and having a wireless charging station.

Referring to FIG. 5, a front perspective view of a consumer electronic system 200A that has multiple consumer electronic device cradles and having a wireless charging station 952. Recently, charging mats have been made available that are capable of charging consumer devices 50/56/60 without the use of cables 30. The consumer devices 50/56/60 need be modified to permit such charging by adding a charge reception system (not shown) to the consumer devices 50/56/60, as known in the industry. In the example shown in FIG. 5, a consumer device 50/56/60, in particular a smartphone 950, is equipped with such charge reception circuitry and is shown being placed on a wireless charging station 952 that is located upon the consumer electronic system 200A. Note that the location of the wireless charging station 952 is shown as an example, and any location on the consumer electronic system 200A is anticipated, including within the cradles 510 and on a platform extending from the front, sides, or back surfaces of the consumer electronic system 200A.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A consumer electronic system comprising:
   an enclosure;
   a cradle formed in the enclosure, the cradle having a cavity and two folding support walls, the cavity sized to contain at least one portion of a consumer electronic device, each of the support walls having a deployed position for supporting the consumer electronic device and a collapsed position;
   a power port interfaced to the enclosure for accepting a host end connector of a device cable; and
   a second end of the device cable having a device end connector for connecting to the consumer electronic device;
   whereas, the device cable removably passes through a gap between the two folding support walls for positioning the device end connector and at least a portion of the consumer electronic device within the cavity.

2. The consumer electronic system of claim 1, further comprising a cable manager, the cable manager having a spool portion for winding the device cable and a cap, the cap having a plurality of cable clips for accepting and holding the device cable, thereby preventing the device cable from unwinding from the spool.

3. The consumer electronic system of claim 1, wherein the power port is on the cap.

4. The consumer electronic system of claim 1, further comprising a second cradle is that is staggered with respect to the cradle to reduce blockage of a display of one of the consumer electronic devices by a different one of the consumer electronic devices.

5. The consumer electronic system of claim 1, wherein the cradle comprises at least one step and each of the at least one step successively supports smaller consumer electronic devices.

6. The consumer electronic system of claim 1, wherein the power port is a universal serial port (USB port).

7. A method of charging a consumer electronic device, the method comprising:
  providing a consumer electronic system comprising:
    an enclosure;
    a cradle formed in the enclosure, the cradle having a cavity and two folding support walls, the cavity sized to contain at least one portion of at least a first consumer electronic device, each of the support walls having a deployed position for supporting one of the consumer electronic devices and having a collapsed position; and
    a power port interfaced to the enclosure;
  connecting a host end connector of a device cable to the power port;
  connecting a device end connector of the device cable to the one of the consumer electronic devices; and
  routing the device cable through the gap between the two folding support walls such that the device end connector is situated within the cavity and the one of the consumer electronic devices is supported by the cradle and the two folding support walls.

8. The method of claim 7, further comprising:
  winding an excess length of the device cable around a hub of a cable manager and passing the device cable through a cable clip in a cap of the cable manager, thereby maintaining the winding of the device cable around the hub.

9. The method of claim 8, wherein the power port is located on the cap of the cable manager.

10. The method of claim 7, wherein the cradle comprises at least one step and each of the at least one step successively supports smaller consumer electronic devices.

11. The method of claim 7, wherein the power port is a universal serial port (USB port).

12. A consumer electronic system comprising:
  an enclosure;
  a plurality of cradles formed in the enclosure for supporting any of a plurality of consumer electronic devices, each of the cradles having a cavity and a pair of folding support walls, the cavity sized to contain at least one portion of at least a first consumer electronic device of the plurality of consumer electronic devices, each of the pair of support walls having a deployed position for supporting a consumer electronic device and a collapsed position;
  a plurality of power ports interfaced to the enclosure, each power port for accepting a host end connector of a device cable; and
  a second end of each of the device cables having a device end connector for connecting to one of the plurality of consumer electronic devices;
  whereas, the device cables removably pass through gaps between each pair of folding support walls for positioning each of the plurality of consumer electronic devices and the device end connector at least partially within a corresponding one of the cavities.

13. The consumer electronic system of claim 12, further comprising a plurality of cable managers, each of the cable managers having a spool portion for winding one of the device cables and a cap, the cap having a plurality of cable clips for accepting and holding the one of the device cables, thereby preventing the one of the device cables from unwinding from the spool.

14. The consumer electronic system of claim 13, wherein each of the at least one cable managers corresponds to one of the plurality of cradles.

15. The consumer electronic system of claim 1, wherein the power port is on the cap.

16. The consumer electronic system of claim 12, wherein at least one of the cradles is staggered with respect to another one of the cradles, thereby reducing blockage of a display of one of the consumer electronic devices by a different one of the consumer electronic devices.

17. The consumer electronic system of claim 12, wherein at least one of the cradles comprises at least one step and each of the at least one step successively supports smaller consumer electronic devices.

18. The consumer electronic system of claim 12, wherein the power port is a universal serial port (USB port).

19. The consumer electronic system of claim 12, wherein the consumer electronic system is a clock radio.

20. The consumer electronic system of claim 12, wherein at least one of the plurality of cradles further comprises a pair of nubs such that a consumer electronic device fits and rests between the nubs and the pair of folding support walls of the at least one of the plurality of cradles.

* * * * *